United States Patent
Grubbs et al.

(10) Patent No.: US 6,829,688 B2
(45) Date of Patent: Dec. 7, 2004

(54) FILE SYSTEM BACKUP IN A LOGICAL VOLUME MANAGEMENT DATA STORAGE ENVIRONMENT

(75) Inventors: Mark Allen Grubbs, Round Rock, TX (US); Gerald Francis McBrearty, Austin, TX (US); Grover Herbert Neuman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 342 days.

(21) Appl. No.: 10/177,843

(22) Filed: Jun. 20, 2002

(65) Prior Publication Data

US 2003/0236956 A1 Dec. 25, 2003

(51) Int. Cl.[7] ............................................... G06F 13/14
(52) U.S. Cl. ....................................................... 711/162
(58) Field of Search ................................ 711/114, 161, 711/162

(56) References Cited

U.S. PATENT DOCUMENTS

| | | | |
|---|---|---|---|
| 5,435,004 A | * | 7/1995 | Cox et al. .................... 707/205 |
| 5,649,158 A | | 7/1997 | Lahr et al. |
| 6,041,366 A | | 3/2000 | Maddalozzo, Jr. et al. |
| 6,105,118 A | | 8/2000 | Maddalozzo, Jr. et al. |
| 6,216,211 B1 | | 4/2001 | McBrearty et al. |

OTHER PUBLICATIONS

Laurent Vanel, et al, *Aix Logical Volume Manager, from A to Z: Introduction and Concepts*, 2000, International Technical Support Organization, IBM Corp., Austin, USA, pp. 'iii'–'viii'.

* cited by examiner

*Primary Examiner*—Kevin L. Ellis
(74) *Attorney, Agent, or Firm*—Casimer K. Salys; Dillon & Yudell LLP

(57) ABSTRACT

A system and method for capturing a point-in-time image of a file system utilized within a data storage system employing logical volumes mapped across physical volumes. The point-in-time backup process begins with receipt of a file system backup request. In response to receiving the file system backup request, buffered file system data is written or flushed to the logical volumes. Specifically, in response to the file system backup request, buffered user data is written to the logical volumes, buffered meta data associated with the buffered user data is written to a file system backup log within the logical volumes, and the buffered meta data is written to the logical volumes. A disk copy of the designated physical volumes is initiated in response to the writing of the buffered file system data to the logical volumes.

13 Claims, 4 Drawing Sheets

US 6,829,688 B2

FILE SYSTEM BACKUP IN A LOGICAL VOLUME MANAGEMENT DATA STORAGE ENVIRONMENT

BACKGROUND OF THE INVENTION

1. Technical Field

The present invention relates in general to data storage systems, and in particular to implementing a data storage system backup. More particularly, the present invention relates to a system and method for capturing a comprehensive point-in-time image of file system user and meta data within a data storage subsystem.

2. Description of the Related Art

Maintaining backup copies of data is necessary. Potential sources of data loss necessitating data backups include hardware failure in the disk drive devices, undetected memory error corrupting data, system power loss, software bugs or viruses, accidental user deletion of data, etc. The nature of any given application greatly influences the frequency with which backups must be taken. In situations where data is subject to frequent changes, backup copies are made with a frequency determined as a function of the complexity of recovery. Often, in today's real time environments, multiple copies of data are simultaneously maintained to avoid, or at least reduce, down time associated with data recovery after an incident resulting in processing interruptions. Users are interested in testing the effects of data changes without incapacitating or halting routine operations. To that end, various techniques are taught in the prior art, ranging from total duplicate systems to duplicate files to mirrored disks to mirrored logical volumes within a system.

Mirroring is a common method employed within logical volume storage environments to maintain multiple copies of data wherein two or more copies of data are stored on two or more different disks. When mirroring is used for a logical volume, additional physical blocks are allocated for storing additional copies of each logical block. When logical volumes have mirrored copies, each mirrored logical volume has one of two states, available and stale. Only blocks which are available are allowed to be read from or written to. Data storage operating systems typically include commands for copying data from an available mirror to a stale mirror and subsequently change the state of the stale block to available.

A logical volume manager (LVM) is included in the Advanced Interactive eXecutive (AIX) operating system from International Business Machines Corp. As utilized herein, a "logical volume manager" is any operating system that enables online disk storage management by adding a virtualization layer between the physical disks and applications users of the disk space such as a file system. A volume manager virtual device, referred to herein as a logical volume, maps a contiguous logical address space to a discontiguous physical disk address space.

An LVM, such as AIX LVM, uses a hierarchy of structures to manage fixed-disk storage. Each individual fixed-disk drive, called a physical volume (PV) has a name, such as/dev/hdisk0. Every physical volume in use belongs to a volume group (VG). All of the physical volumes in a volume group are divided into physical blocks of the same size. The number of physical blocks on each disk varies with the total capacity of the disk drive.

Within each volume group, one or more logical volumes are defined. Logical volumes are groups of information located on physical volumes. Data on logical volumes appears to be contiguous to the user but can be discontiguous on the physical volume. This allows file systems, paging space, and other logical volumes to be resized or relocated, span multiple physical volumes, and have their contents replicated for greater flexibility and availability in the storage of data. Logical volumes can serve a number of system purposes, such as paging, raw data, or contain a single file system.

Each logical volume consists of one or more logical blocks. Each logical block corresponds to at least one physical block. If mirroring is specified for the logical volume, additional physical blocks are allocated to store the additional copies of each logical block. Although the logical blocks are numbered consecutively, the underlying physical blocks are not necessarily consecutive or contiguous.

For logical volumes having mirrored copies, each block of the mirror can have two states, available and stale. Data may be read from any available mirrored block. Data must be written to all available mirrored blocks before returning from a write operation, and only blocks that are marked as available may be read from or written to. An AIX command such as syncvg may be utilized to copy information from an available mirror to the stale mirror and then change a block marked as stale to available.

There are occasions when users want an instant snapshot (i.e. a copy at a specified point in time) of data on a mirrored logical volume. The user may want to simply backup the data; or it may be desired to make changes to the data, run an application, and evaluate the results. The user may then choose to eliminate the changes and restore the original data.

In addition to the considerable time and processing bandwidth consumed during a backup of LVM data storage subsystems, obtaining an accurate, comprehensive point-in-time backup of the file system is problematic. Most disk array systems (e.g. RAIDs) employ disk copy mechanisms such as "flash copy" or "disk split" in which the contents of the disks (i.e. raw logical volumes) are copied to a spare set of disks to obtain a "snapshot" of the data storage contents at any given time. Such hardware backup mechanisms only capture data that has been written or copied to the actual physical storage devices or physical "volumes".

Cache buffering of in-transit data is common in most data storage subsystems particularly for WRITE data. Prior to being written to the physical disks, the buffered data is unavailable to the disk copy backup mechanisms, resulting in an incomplete recordation of the true data storage contents. Furthermore, the meta data generated by the resident file system application in association with user data is also often buffered and hence intermittently unavailable for hardware backup between buffer destage synch times. In addition to the cache buffering of user and meta data, the sheer I/O volume and file system complexity of large scale LVM data storage systems further hampers a system administrator's ability to obtain a valid simultaneous backup of file system data.

It can therefore be appreciated that a need exists for an LVM mechanism enhanced to facilitate a valid point-in-time backup of data stored within a multi-disk volume group. The present invention addresses such a need by implementing a system and method which leverage the fault tolerance features inherent in journaled file systems to provide enhanced on-line or off-line hard disk backup capabilities.

SUMMARY OF THE INVENTION

A system and method are disclosed herein for capturing a point-in-time image of a file system utilized within a data storage system employing logical volumes mapped across physical volumes. The point-in-time backup process begins with receipt of a file system backup request. In response to receiving the file system backup request, buffered file system data is written or flushed to the logical volumes. Specifically, in response to the file system backup request, buffered user data is written to the logical volumes, buffered meta data associated with the buffered user data is written to a file system backup log within the logical volumes, and the buffered meta data is written to the logical volumes. A disk copy of the designated physical volumes is initiated in response to the writing of the buffered file system data to the logical volumes.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention.

As explained in further detail with reference to the figures, the present invention is directed to an improved system and method for capturing a point-in-time image of file system data within a multi-disk data storage subsystem, referred to herein as a "volume group", as managed by an intermediate (i.e. logical) layer management function, referred to herein as a "logical volume manager". Preferred embodiments are illustrated and described herein in the context of a Logical Volume Management (LVM) data storage architecture such as that utilized by the Advanced Interactive eXecutive (AIX) operating system. It should be noted, however, that the inventive principles disclosed herein are more widely applicable to any multi-disk architectures in which data backup issues arise as required to maintain adequate data consistency and security.

Figure 1:
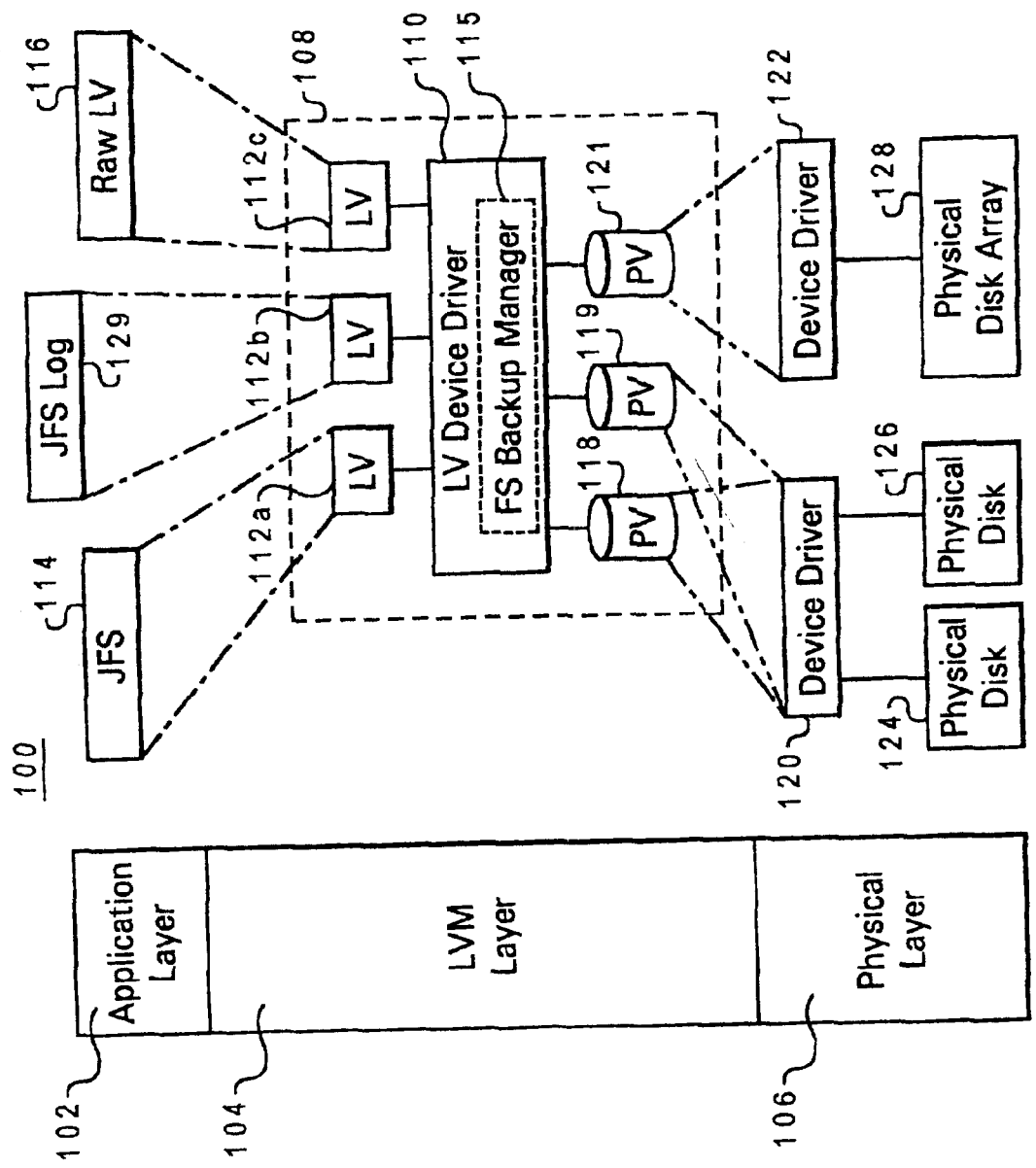
FIG. 1 illustrates a logical volume management data storage subsystem that employs a point-in-time file system backup mechanism in accordance with a preferred embodiment of the present invention.

With reference now to the figures, and in particular with reference to FIG. 1, there is illustrated a logical volume management data storage subsystem that employs a point-in-time file system backup mechanism in accordance with a preferred embodiment of the present invention. As utilized herein, a "volume group" is a collection of one or more physical resources (e.g. disk drives) that are partitioned into a set of logical volumes. As per conventional volume group terminology, a "logical volume" is a virtualized representation of file system data mapped across one or more physical volumes that is processed by a host (e.g. a server node) as a single logical unit. Logical volumes consist of logical blocks, each of which are mapped into one or more physical blocks within the physical volumes. If mirroring is used, a mirrored logical block is mapped to two or more physical blocks. In summary, logical volumes present a simple contiguous view of data storage to an application/user while hiding the more complex and possibly non-contiguous physical orientation of the data.

The logical layer (i.e. LVM layer) 104 of data storage subsystem 100 controls and coordinates disk resources by mapping data between a simple and flexible logical view of storage space within a designated volume group 108 and the physical disk media within disk drives 124 and 126 and a Redundant Array of Independent Disks (RAID) 128. LVM layer 104 does this by using a layer of device driver code, depicted in FIG. 1 as a logical volume device driver (LVDD) 110, that runs above traditional physical device drivers, represented in FIG. 1 as device driver 120 and RAID adapter 122. Disk drives 124 and 126, and the collective drives within RAID 128 are each designated within LVM layer 104 as a physical volume. In the depicted embodiment, disk drives 124 and 126, are physically represented in LVM layer 104 as physical volumes 118 and 119, respectively, while the multiple disk drives within RAID 128 are represented as physical volume 121.

Volume group 108 includes a file system which provides a complete directory structure, including a root directory and any subdirectories and files beneath the root directory. Some of the most important volume group management tasks are facilitated by management of the resident file system. Specifically, file system management tasks include: allocating space for file systems on logical volumes; creating file systems; making file system space available to system users; monitoring file system space usage; maintaining file systems in a consistent state; and backing up file systems to guard against data loss in the event of a system failure.

Often, the native file system type employed in a volume group storage environment such as data storage subsystem 100 is called a journaled file system (JFS). A JFS utilizes database journaling techniques to maintain its structural consistency, preventing damage to the file system when the system is halted abnormally. A JFS thus enhances the backup data reliability of the overall system.

In the embodiment depicted in FIG. 1, logical volumes 112a and 112c, provide a logical view of the data storage resources to an application layer JFS 114 and a raw logical volume application 116 within an application layer 102. This logical view of data storage resources is independent of the underlying physical disk structure as characterized within physical layer 106. In addition to providing an organized structure of files and directories for data resources within volume group 108, JFS 114 includes additional elements to facilitate efficient access to the data resources, including a superblock (not depicted) that maintains information about the entire file system including the size of the file system, the number of data blocks in the file system, allocation group sizes, and a flag that indicates the state of the file system.

JFS 114 uses a database journaling technique to maintain a consistent file system structure. This journaling technique includes duplicating transactions involving changes to file system meta-data to a JFS log 129 that is maintained as a specialized logical volume (logical volume 112b in the depicted embodiment). JFS log 129 is utilized as a circular journal for recording modifications to the file system meta-data. Such file system meta-data may include a superblock containing global file system information, i-nodes containing file access information, indirect data pointers, and directories. When meta-data is modified in the course of application layer processing, a duplicate transaction is recorded in the JFS log.

As explained in further detail with reference to FIGS. 2, 3, and 4, the present invention employs a point-in-time file system backup manager 115 within LVM layer 104 to facilitate data backup within data storage subsystem 100. Specifically, a file system backup manager 115 is utilized to coordinate specified processing steps which, when executed in a particular sequence, result in the capture of the on-disk file system contents as well as the interim buffered and logged file system at a given point in time.

Figure 2:
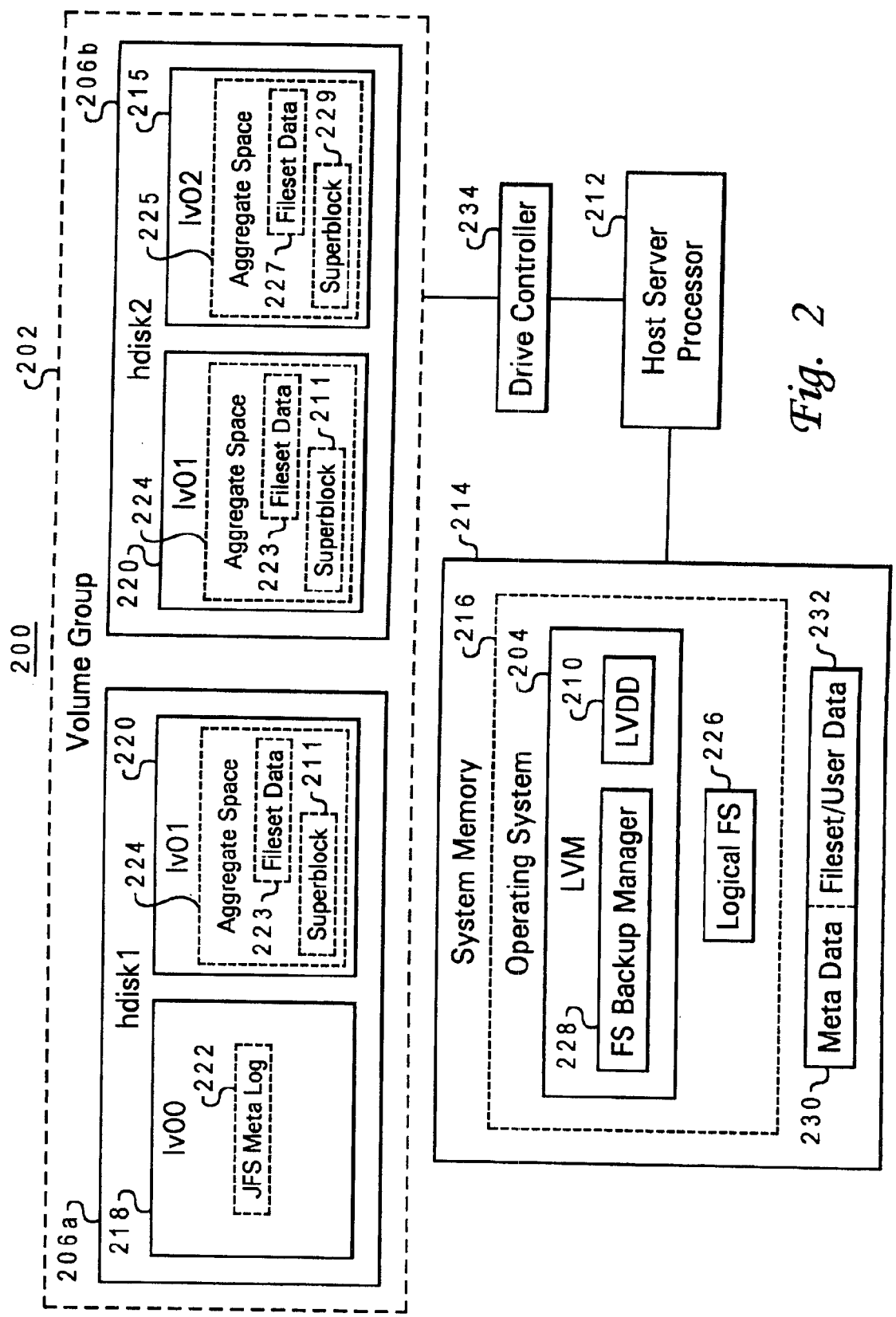
FIG. 2 depicts deployment of a point-in-time file system backup mechanism within a server-hosted data storage system in accordance with a preferred embodiment of the present invention.
Figure 3:
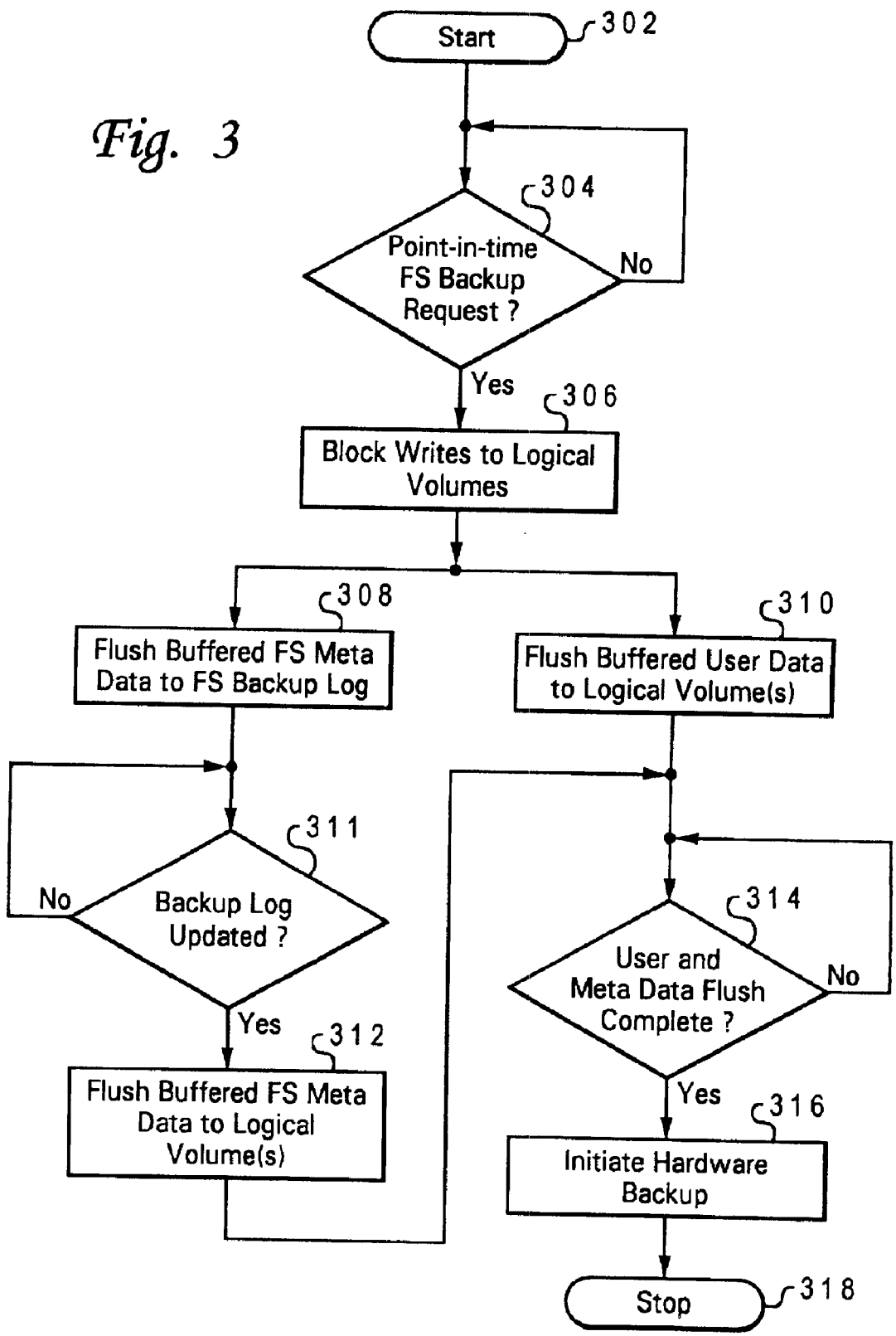
FIG. 3 is a flow diagram illustrating a process for implementing a point-in-time file system backup in accordance with a preferred embodiment of the present invention.

FIG. 2 illustrates deployment of a point-in-time file system backup mechanism within a server-hosted data storage system in accordance with a preferred embodiment of the present invention. As illustrated in FIG. 2, a server-hosted data storage system 200 includes data storage and management devices including a host server processor 212 and associated system memory 214. An LVM 204, deployed by a suitable operating system application 216, such as the Advanced Interactive eXecutive (AIX), provides the requisite mapping between various physical storage resources including a pair of physical volumes 206a and 206b and three logical volumes 218, 220, and 215. LVM 204 consists of an LVDD 210 and a subroutine interface library. LVDD 210 is a pseudo device driver that manages and processes all I/O transactions for volume group 202, in part, by translating logical addresses into physical addresses and sending I/O requests to physical layer device drivers (depicted as 120 and 122 in FIG. 1), which in turn communicate with a drive controller 234 to access physical volumes 206a and 206b.

In the depicted embodiment, logical volumes 218, 220, and 215 are utilized in a structured manner in which the object logical volume stores ordinary files (data or programs). For "structured" logical volumes 218, 220, and 215, operating system 216 supports a JFS, which is a hierarchical structure of files and directories, as explained with reference to FIG. 1. The JFS employed within data storage system 200 includes an on-disk layout, or "physical file system", and a corresponding logical file system 226.

The on-disk layout is embodied by various data structures within physical volumes 206a and 206b. In the depicted embodiment, these file system layout data structures are included in a pair of aggregate spaces 224 and 225 within logical volumes 220 and 215, respectively. Aggregate spaces 224 and 225 include fileset spaces 223 and 227, each including a set of files and directories (not depicted). In this context, "directories" map user-specified names to corresponding files and form the traditional file naming hierarchy. Within a fileset, a "file" contains user data that is processed by the JFS as an uninterpreted byte stream. Aggregate spaces 224 and 225 further include superblocks 211 and 229, respectively, which contain aggregate-wide information including the mounting status (i.e. mounted or unmounted) of the file system.

Together, the aggregate superblocks, directories, and other various addressing structures that are typically included within aggregate spaces 224 and 225, represent JFS control structures or meta data for logical volumes 220 and 215. The corresponding "file" data structures (not depicted) within filesets 223 and 227 constitute the user data currently stored on disk within volume group 202.

Logical file system 226, deployed within a sub-application of operating system 216, provides transaction management of the physical file system layout within physical volumes 206a and 206b. To this end, logical file system 226 serves as an operating system kernel interface that enables a user to access the file system layout on physical volumes 206a and 206b using a given set of application layer commands.

One of the key distinguishing feature of any JFS is meta data logging. In the depicted embodiment, logical volume 218 is designated as a log device that employs circular journaling for recording modifications to file system meta data into a backup log 222. When meta data is modified, and prior to the meta data being written on-disk, a duplicate transaction is copied to backup log 222. Examples of operations requiring meta data logging include creating, renaming, or removing files and directories, linking, etc. Logging of meta data to backup log 222 ensures that if the system fails as the result of a power failure or system crash, no file system transaction will be left in an inconsistent state.

As now explained with reference to FIGS. 3 and 4, the point-in-time file system backup procedure of the present invention includes a two-part user/meta data update from memory buffering to ensure that the file system is up-to-date and is in a known state prior to commencing a hardware backup operation. The following descriptions of FIGS. 3 and 4 are explained as processes implemented in the context of the data storage systems illustrated in FIG. 2. Referring to FIG. 3, there is depicted a flow diagram illustrating a process for implementing a point-in-time file system backup in accordance with a preferred embodiment of the present invention. The process begins as shown at step 302 and proceeds to step 304 with a determination of whether or not a file system backup request has been received by operating system 216. Such a backup request will typically either directly or indirectly specify one or more object physical volumes. For purposes of illustration, it will be assumed that a backup request detected at step 304 specifies physical volumes 206a and 206b to be the object of the request.

Responsive to a file system backup request for physical volumes 206a and 206b, processor 212 under the direction of file system backup manager 228 is prompted to begin issuing a sequence of coordinated instructions designed to effectuate the point-in-time file system backup. As depicted at step 306, the first step in the point-in-time backup process is for file system manager 228 to deliver a system call prompting logical file system 226 to block write operations to the logical volumes specified directly or indirectly in the backup request detected at step 304. In one embodiment of the present invention, the blocking of write operations is accomplished using well-known kernel locking mechanisms. After blocking writes to logical volumes 218, 220, and 215, file system backup manager 228 initiates a file system update procedure. Included in this update procedure, and as illustrated at step 310, the set of user data 232 (i.e. file data) currently buffered in system memory 214 is written or flushed to appropriate locations in filesets 223 and/or 227 contained within logical volumes 220 and/or 215.

To provide a complete and consistent file system image, the destaging of buffered user data 232 to logical volumes 220 and 215 is complemented by a meta data destaging sub-process depicted at steps 308 and 312. First, the set of meta data 230 associated with buffered user data 232 within system memory 214 is written or flushed to backup log 222 within physical volume 206a. The updating of backup log 222 in this manner ensures that if a system failure (due to a power failure, for example) occurs during the point-in-time backup process, the file system can be efficiently restored. After receiving a reply indicating that backup log 222 has been updated (step 311), and as depicted at step 312, processor 212 under the direction of file system backup manager 228, issues instructions to update the file system meta data in aggregate spaces 224 and 225 within logical volumes 220 and 215 from the updated contents of backup log 222.

Together, the user and meta data destaging steps 310, 308 and 312, ensure that physical volumes 206a and 206b contain a most recently updated and mutually consistent version of the user and meta data resident anywhere in the system at the time the point-in-time file system backup request was received. As illustrated at step 316, responsive to signals indicating that both the user and meta data updates to physical volumes 206a and 206b have been completed (step 314), the point-in-time file system backup process continues with processor 212, under instruction from file system backup manager 228, issuing a hardware backup instruction to drive controller 234 to initiate a disk copy procedure in which physical volumes 206a and 206b are copied to alternate non-volatile storage, such as two other physical volumes (not depicted). Several known hardware backup instructions may be used including a "flash" copy or a "split disk" copy. Following the disk copy procedure, the point-in-time backup concludes as depicted at step 318.

Figure 4:
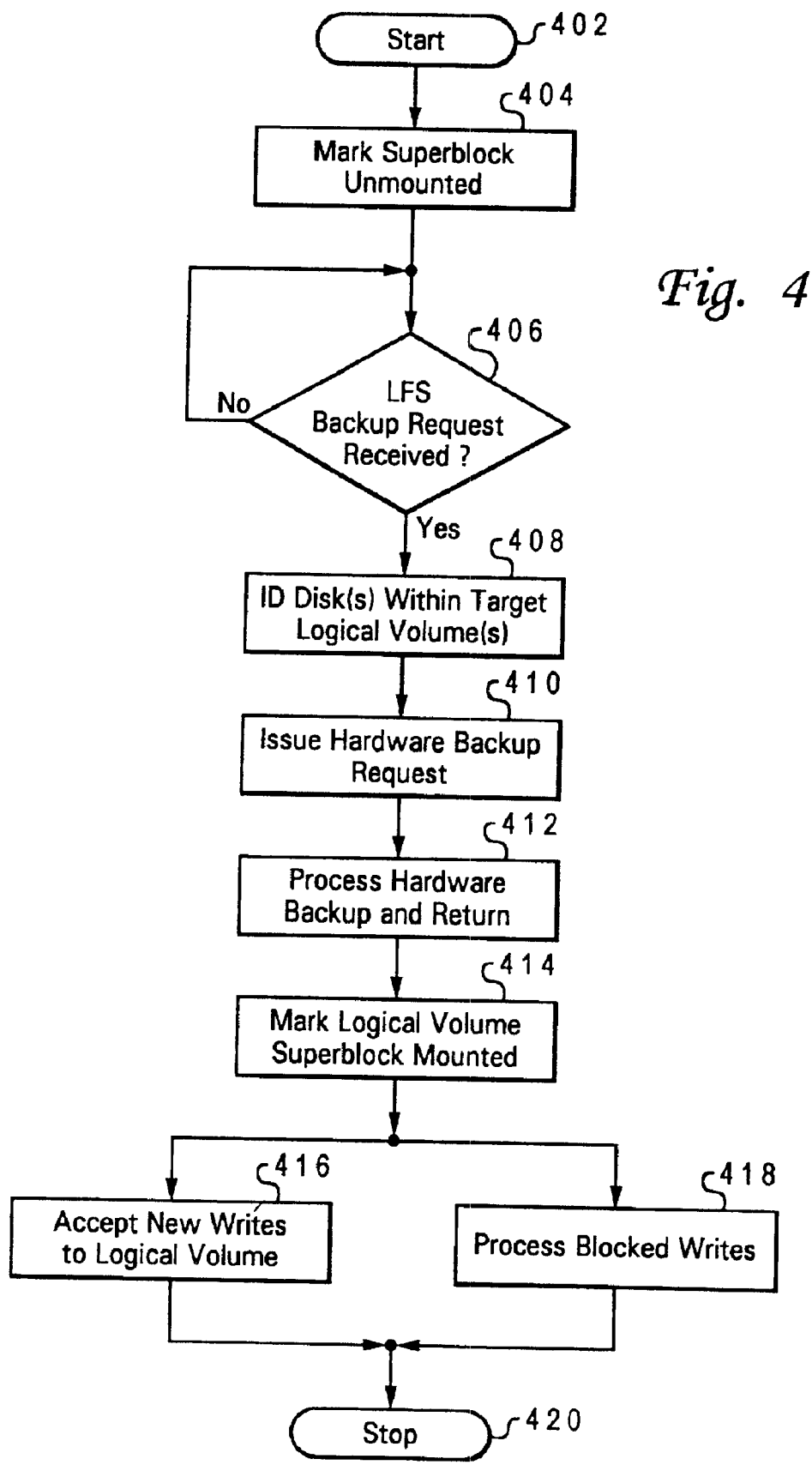
FIG. 4 is a flow diagram depicting process steps performed during a hardware backup cycle as incorporated in the point-in-time file system backup process of the present invention.

With reference to FIG. 4, there is illustrated a flow diagram depicting process steps performed during a hardware backup cycle as incorporated in the point-in-time file system backup process explained with reference to FIG. 3. Specifically, the steps explained with reference to FIG. 4 constitute a hardware backup cycle initiated at step 316 of FIG. 3. Beginning as shown at step 402 and proceeding to step 404, in preparation for the hardware backup, superblocks 211 and 229 within physical volumes 206a and 206b, respectively, are marked as "file system unmounted". The unmounted status designation within superblocks 221 and 229 indicates to system requestors, including drive controller 234, that the resident file system layout (i.e. file system data within aggregate spaces 224 and 225) is not available for file system data transactions and is therefore in a known or "clean" state. Typically, the superblock marking step is implemented by logical file system 226.

Following the marking of superblocks 211 and 229 as unmounted, logical file system 226 issues a system call to LVM 204 requesting a file system backup (step 406). The file system backup request issued by logical file system 226 includes a direct or indirect indication of each of the logical volumes (220 and 215) to be copied. As depicted at step 408, responsive to receiving the file system backup request, LVM 204 determines the identity of the physical volumes (i.e. disks) across which logical volumes 220 and 215 are mapped (assuming that logical volumes 220 and 215 are directly or indirectly specified at step 406). A file system backup request specifying logical volumes 220 and 215 as the targets will result in LVM 204 identifying physical volumes 206a and 206b at step 408.

The physical volume identifications obtained at step 408 are utilized as the target identifiers for direct disk copy instructions issued by a disk copy mechanism (not depicted) within or in communicative contact with disk controller 234 (step 410). The particular disk copy instruction utilized at step 410 may vary depending on the semantics of the object system. As noted above, a flash copy or split disk copy are examples of such hardware backup instructions that maybe utilized for obtaining a "hard copy" of the file system contents of physical volumes 206a and 206b onto two other physical volumes. Responsive to completion of the disk copy instructions wherein the contents of physical volumes 206a and 206b are duplicated on two other physical volumes (step 412), logical file system 226 marks superblocks 211 and 229 as "file system mounted". Conversely to the "unmounted" designation, a mounted designation indicates to system requestors, including drive controller 234, that the resident file system layout (i.e. file system data within aggregate spaces 224 and 225) is available for file system data transactions and is therefore in an unknown or "dirty" state. As illustrated at steps 416 and 418, the "mounted" file system status coincides with the removal of the blocking of writes to physical volumes 206a and 206b, and the process terminates as depicted at step 420.

Preferred implementations of the invention include implementations as a computer system programmed to execute the method or methods described herein, and as a program product. According to the computer system implementation, sets of instructions for executing the method and system of the present invention are resident in a storage device such as the ROM or RAM of computer processing systems within one or more networked nodes. Until required by the computer system, the set of instructions may be stored as a computer-program product in another computer memory, for example, in a disk drive (which may include a removable memory such as an optical disk or floppy disk for eventual utilization in disk drive).

A method and system have been disclosed for capturing a valid point-in-time file system backup for a data storage subsystem. Although the present invention has been described in accordance with the embodiments shown, one of ordinary skill in the art will readily recognize that there could be variations to the embodiments and those variations would be within the spirit and scope of the present invention. Accordingly, many modifications maybe made by one of ordinary skill in the art without departing from the spirit and scope of the appended claims.

What is claimed is:

1. A method for capturing a point-in-time image of a file system within a logical volume mapped across a physical volume, said method comprising:

in response to receiving a file system backup instruction, writing buffered file system data to said logical volume; and in response to said writing buffered file system data to said logical volume, initiating a copy of said physical volume to a non-volatile storage device by receiving a disk copy instruction;

marking said file system as unmounted within said logical volume; and copying said file system from said physical volume to another physical volume.

2. The method of claim 1, wherein said file system includes user data and meta data, said method further includes in response to receiving a file system backup instruction, writing buffered user data to said logical volume;

writing buffered meta data associated with said buffered user data to a file system backup log within said logical volume; and writing said buffered meta data to said logical volume.

3. The method of claim 2, wherein said writing buffered meta data associated with said buffered user data to a file system backup log further includes flushing all meta data contained within said file system backup log to one or more blocks of said logical volume containing said file system.

4. The method of claim 1, wherein said method further includes blocking application layer write operations to said logical volume during said writing buffered file system data and said initiating a copy of said physical volume to a non-volatile storage device.

5. The method of claim 4, wherein said blocking application layer write operations to said logical volume further includes setting a kernel locking mechanism.

6. The method of claim 1, wherein said copy of said physical volume to a non-volatile storage device is a flash copy or a disk split operation.

7. The method of claim 1, wherein said processing a disk copy instruction is followed by marking said file system as mounted within said logical volume.

8. A program product for capturing a point-in-time image of a file system within a logical volume mapped across a physical volume, said program product comprising:

instruction means, responsive to receiving a file system backup instruction, for writing buffered file system data to said logical volume; and instruction means, responsive to said writing buffered file system data to said logical volume, for initiating a copy of said physical volume to a non-volatile storage device by receiving a disk copy instruction;

marking said file system as unmounted within said logical volume; and copying said file system from said physical volume to another physical volume.

9. The program product of claim 8, wherein said file system includes user data and meta data, said program product further includes instruction means, responsive to receiving a file system backup instruction, for:

writing buffered user data to said logical volume;

writing buffered meta data associated with said buffered user data to a file system backup log within said logical volume; and writing said buffered meta data to said logical volume.

10. The program product of claim 9, wherein said instruction means for writing buffered meta data associated with said buffered user data to a file system backup log further includes instruction means for flushing all meta data contained within said file system backup log to one or more blocks of said logical volume containing said file system.

11. The program product of claim 8, wherein said program product further includes instruction means for blocking application layer write operations to said logical volume during said writing buffered file system data and instruction means for initiating a copy of said physical volume to a non-volatile storage device.

12. The program product of claim 11, wherein said instruction means for blocking application layer write operations to said logical volume further includes instruction means for setting a kernel locking mechanism.

13. The program product of claim 8, wherein said copy of said physical volume to a non-volatile storage device is a flash copy or a disk split operation.

* * * * *